United States Patent
Kirschner et al.

(10) Patent No.: US 7,842,911 B2
(45) Date of Patent: Nov. 30, 2010

(54) METHOD FOR DETERMINATION OF THE DIRECTION TO AN OBJECT TO BE SURVEYED BY SELECTING ONLY A PORTION OF IMAGE INFORMATION DEPICTING THE OBJECT FOR SUCH DIRECTION DETERMINATION

(75) Inventors: Holger Kirschner, Heerbrugg (CH); Roland Graf, Untereggen (CH)

(73) Assignee: Leica Geosystems AG, Heerbrugg (CH)

( * ) Notice: Subject to any disclaimer, the term of this patent is extended or adjusted under 35 U.S.C. 154(b) by 762 days.

(21) Appl. No.: 10/571,208

(22) PCT Filed: Sep. 10, 2004

(86) PCT No.: PCT/EP2004/010157

§ 371 (c)(1),
(2), (4) Date: Aug. 23, 2007

(87) PCT Pub. No.: WO2005/026767

PCT Pub. Date: Mar. 24, 2005

(65) Prior Publication Data

US 2008/0116354 A1    May 22, 2008

(30) Foreign Application Priority Data

Sep. 12, 2003    (EP) .................................. 03020734

(51) Int. Cl.
*H01J 40/14*    (2006.01)

(52) U.S. Cl. ..................................... 250/221; 250/208.1
(58) Field of Classification Search .............. 250/208.1, 250/221; 356/141.5, 141.1, 4.01, 3.01
See application file for complete search history.

(56) References Cited

U.S. PATENT DOCUMENTS 7,633,610 B2 *    12/2009    Walser ..................... 356/141.5

FOREIGN PATENT DOCUMENTS

| CN | 1293518 | 5/2001 |
| EP | 0474307 | 11/1992 |
| EP | 0661519 | 5/1995 |
| WO | 02/69268 | 6/2002 |

* cited by examiner

*Primary Examiner*—Que T Le
(74) *Attorney, Agent, or Firm*—Workman Nydegger

(57) ABSTRACT

An image depicting an object is recorded for the purpose of measuring the direction to said object, after which the object is to be surveyed. In order to achieve an optimum stability for rapid changes to the object's position, image sensors are used to analyze or download only a part of the available pixels. A selection of the analyzed image information, as above, uses information about the required measurement accuracy and the time performance of the image sensor. According to the invention, the limitation of the downloaded information can be achieved by the selection of a partial region of the image using the combination of a sub-sampling with a sub-windowing. A selection of image points for downloading within the partial region of the image can thus be achieved by the use of the determined omitted image information.

11 Claims, 4 Drawing Sheets

METHOD FOR DETERMINATION OF THE DIRECTION TO AN OBJECT TO BE SURVEYED BY SELECTING ONLY A PORTION OF IMAGE INFORMATION DEPICTING THE OBJECT FOR SUCH DIRECTION DETERMINATION

The invention relates to a method for determining the direction to an object to be surveyed and a computer program product and a computer data signal.

BACKGROUND

In many geodetic problems or applications, it is required to determine, from a detection point, the direction to an object point, such as, for example, the azimuthal angle and angle of elevation to a further reference point or the compass direction. Such problems are classical tasks of geodesy.

In order to make an object point or an object to be surveyed detectable and surveyable, this object point is distinguished from other points in space, for example by virtue of radiation being actively emitted by it.

Another possibility for distinguishing an object point is to increase the directed reflectivity in the object point, for example by mounting one or more reflectors, for example a corner cube with its inversion centre on the point or in a defined environment of the point.

A further example for distinguishing an object point is its definition as a position relative to a known object form, such as, for example, a fixed target, or relative to an edge/corner/centre/centre of gravity of an object.

From the detection point, a defined solid angle element or field of view of a detector, which contains or should contain the object point, is detected and recorded by a sensor so that monitoring is possible. If the object point is present within the monitored solid angle element, the distinguishing of the object point leads to a pattern on the sensor by virtue of an image. This pattern specific to the object is focussed on the detector in a direction-dependent manner with a certain bearing or position. This position of the pattern on the sensor permits a calculation of the direction of the object point relative to the detection point, it being possible, if required, to include additional information.

An example of such an image which can be used for direction determination is the focused image of the object point and its defined environment on a position sensitive device (PSD) or image sensor with the use of an objective or of a diffractive optical system. Another example is imaging with infinite focus, which directly assigns a direction-dependent position on the sensor to received object rays. In this example, the divergent radiation emitted by an object point is focussed to give a pattern having approximately circular symmetry on the sensor.

The position of the pattern is determined by the sensor or evaluation electronics and converted into the sought direction of the object point relative to the detection point, it being possible, if required, to use additional information about object properties, object distance and detector properties.

As a suitable sensor which permits position determination, it is possible to use, for example, a PSD as an individual sensor or an image sensor as a matrix of individual sensors, so-called pixels or image points. The latter has the advantage that any troublesome stray light is distributed over the individual sensors or pixels of the image sensor, and the utilisation of the sensor dynamics and the signal/background ratio are more advantageous than with the use of only one individual sensor.

However, a disadvantage of the use of image sensors is the considerably increased time requirement for reading out and evaluating the pixels in comparison with the use of only one individual sensor. For example, a VGA image sensor having 640×480 pixels requires a time which is 307,200 times greater in comparison with the use of an individual sensor.

In the determination of the direction to an object or an object point, problems due to an increased time requirement for reading out and processing the sensor signal are encountered with the use of two-dimensional sensors, which is advantageous because of the stability to interfering radiation, so that a comparatively low measuring frequency of the direction determination results.

The direction determination can be divided into two problems depending on the application:

Static measuring task—Here, the object point is immobile or has a change of direction relative to the detector which is negligible with respect to required accuracy and measuring frequency of the direction determination.

Dynamic measuring task—Here, the change of direction from the object point to the detector is not negligible. In the dynamic measuring task, problems arise if the change of the direction to the object point during the evaluation of the measurement is so great that the object point is outside the field of view of the detector during the subsequent measurement. If a plurality of measurements follow one another, the direction from the object point to the detector may change in the course of the measurements, for example by a random or involuntary movement of the object point. Such changes, which may be repeated, give rise to problems in the direction determination if the object point leaves the field of view of the detector.

In this case, tracking of the field of view, possibly also performed automatically, for example for target tracking, becomes more difficult. Under unfavourable circumstances, tracking based on the direction measurement and with the aim of detecting the object point again can no longer be carried out, so that the measurement may have to be stopped under certain circumstances.

Optimization of the stability of the direction measurement to rapid changes in the direction is therefore advantageous. However, a specified accuracy of measurement of the direction measurement must be reached.

A special case of the direction measurement considers accuracies of measurement which are greater than or equal to the field of view angle of the detector. The measuring task therefore now consists in the decision or verification that the object point is within the field of view of the sensor. This is sufficient, for example, for tracking the object point.

A high measuring frequency—adapted if required—leads to a higher tolerance of the regulation to rapid changes of direction and is therefore also advantageous in this special case.

High measuring frequencies are also advantageous in the case of the static measuring task, since, in the case of the rapid measurement, a plurality of individual measurements can be gathered within the time determined by the application and an increase in the accuracy of the measurement is thus possible. Moreover, brief strong disturbances, which can be eliminated in the case of rapid measurement, occur in the event of a disturbance of the measurement by turbulent air flows (heat striae).

SUMMARY

An object of the present invention is to provide a method which stabilizes direction measurements to changes of direction, while maintaining the required accuracy of measurement.

A further object of the present invention is to permit tracking based on a direction measurement, even in the case of relatively high angular velocities or angular accelerations of objects to be detected.

The invention relates to a method for determining the direction to an object point, an image sensor or an array of individual sensors being used for reasons of stability to stray light.

In the case of special types of image sensors, such as, for example, CMOS image sensors, it is possible to access individual image points or pixels directly. Such image sensors firstly permit the limitation of the—for example square—evaluated image field of the sensor in the form of so-called "subwindowing". Associated with the reduction in the number of pixels read out is a shorter time during reading out and subsequently processing the pixel data.

Secondly, in the case of such sensors, a time gain can also be achieved by so-called "subsampling". This is the reading out of, for example, only every $2^{nd}$ ($3^{rd}$, $4^{th}$, ...) column and/or only every $2^{nd}$ ($3^{rd}$, $4^{th}$, ...) row of the image sensor array.

According to the invention, optimization of the stability of the direction determination to changes in the direction is effected by the choice of that combination of subsampling and subwindowing which is optimum in this context on the basis of the required accuracy of measurement and on the basis of the sensor timing. For this purpose, information about both the required accuracy of measurement and the time behaviour of the image sensor is used. The optimization can of course also be effected with specification of one or more secondary conditions, for example limits for the measuring frequency.

Subsampling and subwindowing are combined so that a quantity of pixels is selected within a partial region of the image detected by the detector, so that no pixels are taken into account outside the partial region. The parameters for selecting the partial region and the parameters for selecting the pixels within the partial region are optimized while maintaining the necessary accuracy of measurement.

The method according to the invention has advantages over pure subwindowing or pure subsampling since the optimization of the subwindowing as a function of time i.e. for achieving a high measuring frequency, would mean a maximum reduction of the area of detection. On the other hand owing to the evaluation of the total detection area, pure subsampling is, with regard to the minimum number of pixels to be evaluated, substantially greater than the method according to the invention, resulting either in lower measuring frequencies with the same accuracy of measurement or lower accuracies of measurement with the same measuring frequency.

Below, the reading out of only every N th column (or N th row) is designated as N fold column subsampling (N fold row subsampling).

In both cases, only a portion of the image information recorded by means of the image sensor is used. In the simplest case, this consists in the selection of a portion of the pixels whose content will be read out. However, it is also possible to form aggregates of a plurality of pixels, for example in the form of the combination to give superstructures of pixels.

In a step upstream of the actual direction measurement, the conditions or parameters of the image recording and image evaluation can be established. On the basis of object size, object distance and/or desired accuracy of measurement, it is decided whether/and which, column subsampling and whether/and which row subsampling can be carried out. Here, the pattern position which permits the calculation of the direction to the object point should also be capable of being determined sufficiently accurately by means of subsampling. This applies in particular if the pattern is generated by a focused image of a complex object point environment. The position of the image of a measuring mark on a sensor can be extracted sufficiently accurately only if this image includes a relatively large number of pixels—dependent on the complexity of the marking. An example of an estimation of the accuracy of the measurement for a simple pattern is outlined below, the description being given only for the row direction of the sensor. The procedure in the case of column direction is effected analogously.

The pattern contains positions recognisable in the horizontal (row) direction of the sensor. $N_T$. These are typically light-dark or dark-light transitions. Furthermore the recognisable positions generally lie at the edge of the pattern, i.e. the recognisable positions are frequently not part of the texture of the pattern.

From object size and object distance, it is possible to calculate the size or the pattern on the sensor. If the recognisable positions of the pattern are not oriented on the pixel grid, which is scarcely a limitation for practical applications, the number of pixels on the edge thereof can therefore be estimated and $N_T$ thus determined. For the error of the position determination $E_p$ of the pattern, the following proportionality relationship is obtained.

$$E_P \propto \frac{T}{\sqrt{N_T}} \qquad (1)$$

where G specifies the insensitive gap between two pixels. For this purpose, it is also necessary to take into account the error which results from the signal noise.

Without subsampling, G is the distance between the sensitive areas of adjacent pixels, from which a filling factor <1 results for G>0. With subsampling, the area of the pixels which have not been read out and are present between the pixels read out is added to this pixel spacing, the subsampling also reducing $N_T$.

The proportionality factor in equation (1) can be theoretically derived or determined on the basis of measurements for simple patterns.

N-fold subsampling can be determined with the maximum N which still ensures the desired accuracy of the measurement of the direction measurement.

With the ideal choice of subwindowing, the previously made choice of subsampling must be taken into account. In addition, it may be advantageous to include the size of the pattern in the optimization, it also being possible, for example, to estimate said size from the object distance.

The size of the field of view is adjusted so that a maximum angular acceleration of the object point which occurs between two direction measurements can be tolerated, i.e. the size of the field of view is chosen so that, in spite of the angular acceleration, the object point is still present in the field of view of the detector during the second measurement.

The term of "geodetic surveying" or "geodetic application" is always intended to designate generally measurements which include a determination or checking of data with spatial reference. In particular, it is also to be understood as meaning all applications which are effected in association with the use of a geodetic instrument or geodetic measuring device. This applies in particular to theodolites and total stations as tacheometers with electronic angle measurement and electrooptical telemeter. Similarly, the invention is suitable for use in specialised apparatuses having a similar functionality, for example in military aiming circles or in the monitoring of industrial structures or processes or machine positioning or guidance.

BRIEF DESCRIPTION OF THE DRAWINGS

The method according to the invention is described in more detail below purely by way of example with reference to working examples shown schematically in the drawing.

Specifically.

DETAILED DESCRIPTION

Figure 1:
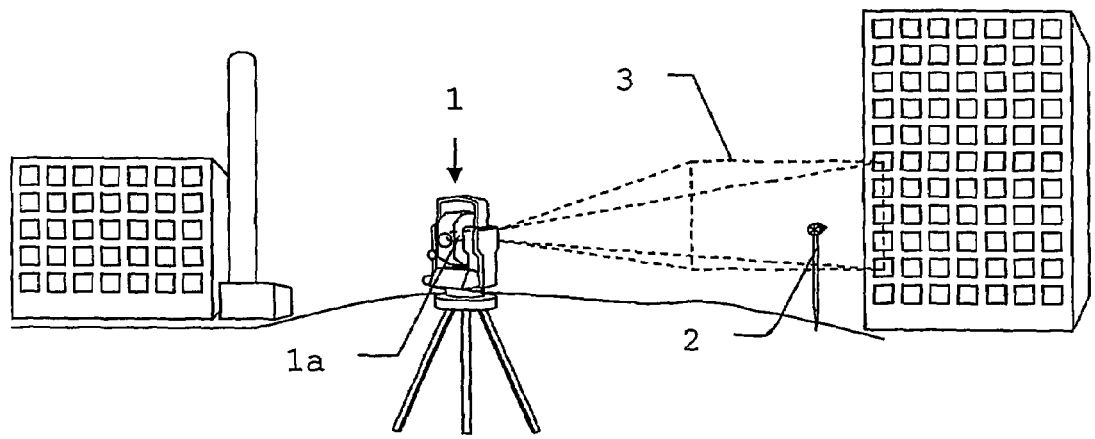
FIG. 1 shows the diagram of a possible use of the method for surveying.

FIG. 1 shows a possible use of the method according to the invention for surveying. By means of a total station as a geodetic measuring device 1, reference points which are recognisably characterized by a plumbing staff having a reflector as object 2 are surveyed on a building site. The image sensor 1a integrated in the measuring device 1 has a sensor field of view 3 in which the object 2 to be surveyed should be present. The direction to this object 2 is determined. Although in this figure the sensor field of view 3 is shown as being rectangular purely by way of example, it can also have other shapes.

Figure 2:
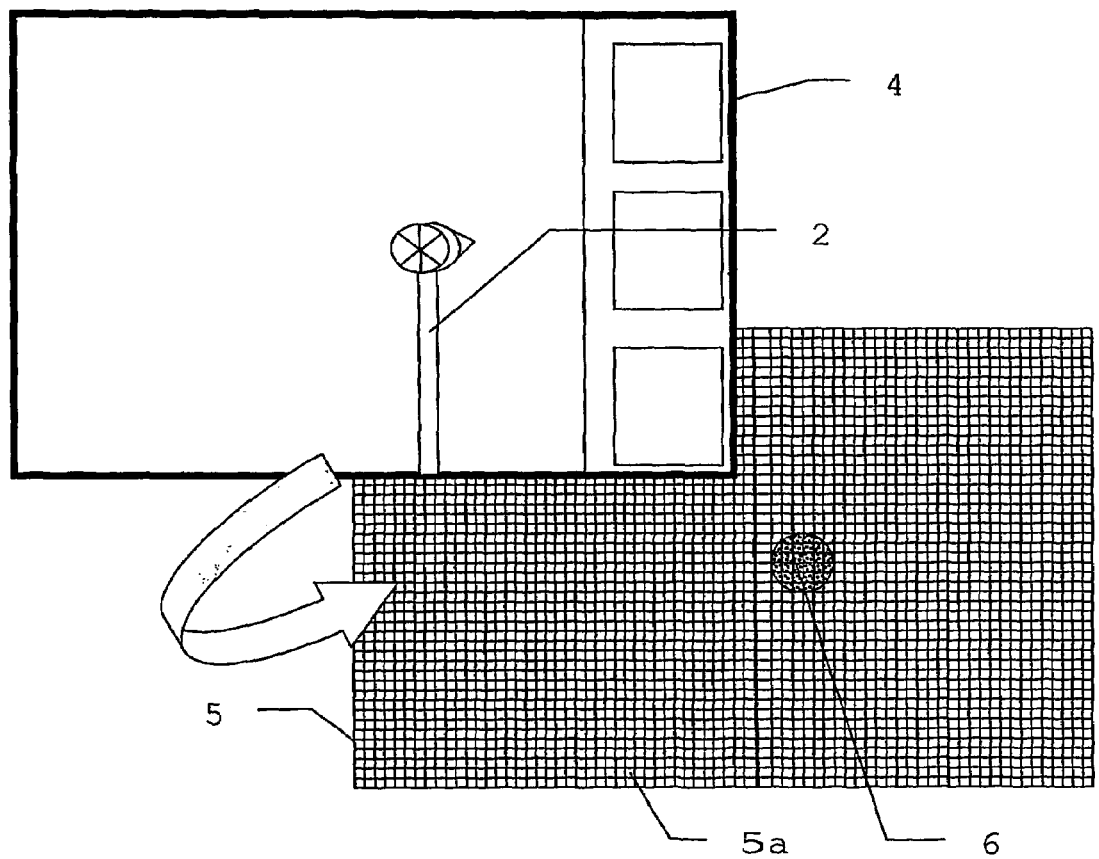
FIG. 2 shows the diagram of the recording of an image with a pattern by means of an image sensor.

FIG. 2 shows the diagram of the recording of an image 4 with a pattern 6 by means of an image sensor. The image 4 recorded by the image sensor registers the object 2 to be surveyed. This image 4 is recorded by the sensor by an array 5 of pixels and converted into signals which can be electronically evaluated. A pattern 6 on the array 5 corresponds to the object 2 to be surveyed. This pattern 6 and the pixels coordinated with it can be identified, for example, on the basis of the transition from light to dark. However, the reading out of all pixels 5a of the array 5 requires a certain time, which determines the achievable frequency of the image processing. For determining the direction of the object 2, however, it is sufficient to know the bearing of the sample 6 in the image 4 or on the array 5 so that not all pixels 5a of the array 5 are required to the full extent. While a complete read-out is always effected in the case of CCD cameras the individual pixel 5a can be selectively read out in the case of other designs, such as, for example, CMOS cameras, so that a use tailored to the image content required for the direction determination can be realised.

Figure 3:
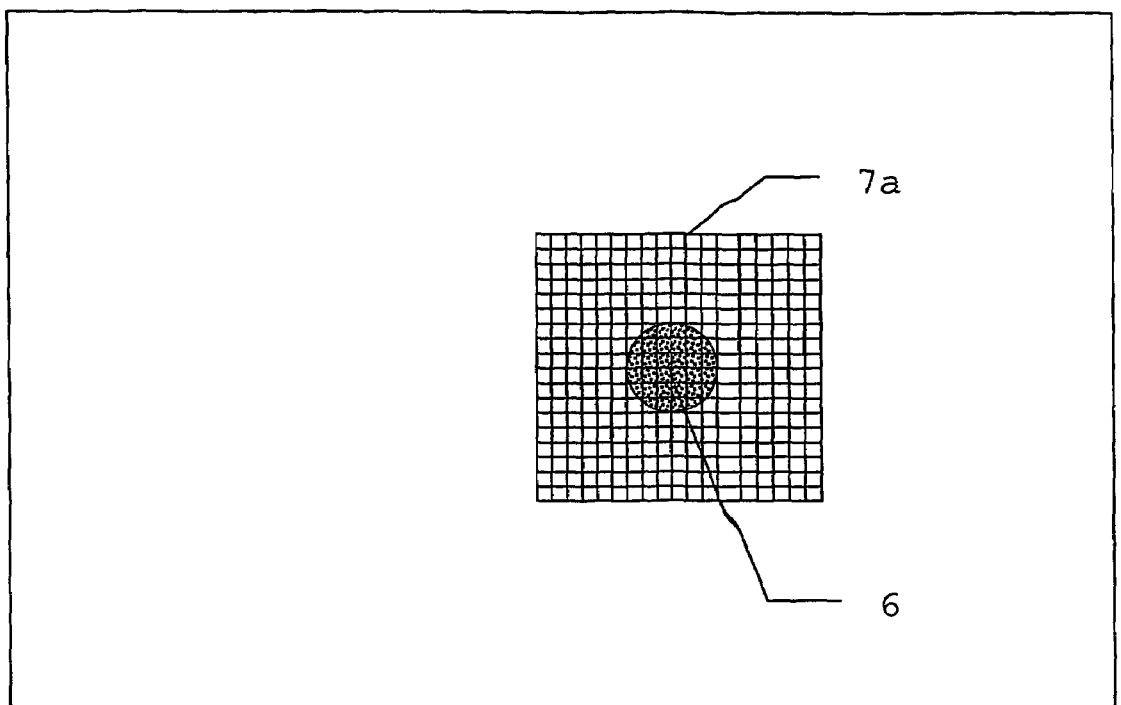
FIG. 3 shows the diagram of a selection of image information by subwindowing.

FIG. 3 shows the diagram of a selection of image information by subwindowing. The pattern 6 of the object detected in the image 4 is recorded by a cohesive portion of the pixels of the image sensor, this portion defining a window as partial region 7a of the image 4. This means that only a part of the image defined by the field of view of the sensor is evaluated, the evaluation, however, using all available pixels in the partial region 7a considered. The reduction of the pixels used can be effected even during a recording by using only a part of the pixels at all for recording—for example on the basis of hardware measures—or in the determination of the position of the pattern by reading out only a part of the image information available in principle.

Figure 4:
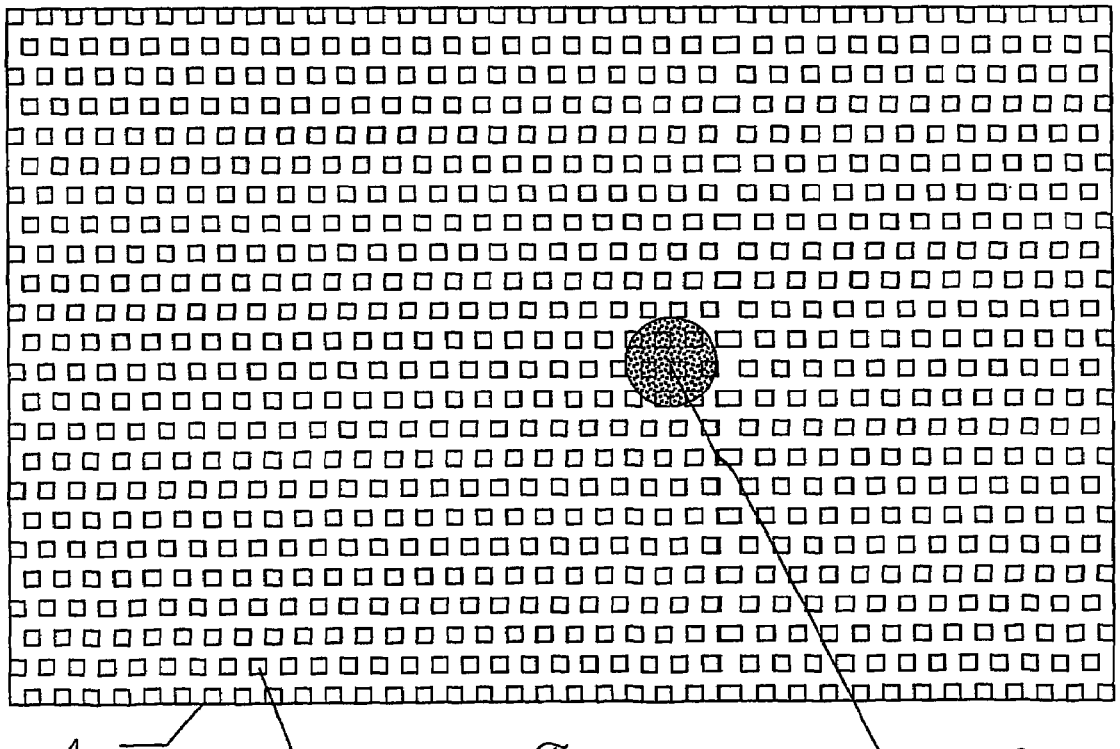
FIG. 4 shows the diagram of a selection of image information by subsampling.

FIG. 4 shows the diagram of a selection of image information by subsampling. Here, pixels 5a are excluded from use according to a certain scheme so that only the content of a portion of pixels 5a is used. In this example, only every 2nd pixel 5a is used in each row and in addition the content of every $2^{nd}$ row is completely neglected. Moreover, the pixels 5a used are offset relative to one another row by row. The pattern 6 of the object detected in the image 4 is recorded by a portion of the pixels 5a of the image sensor, this portion covering the entire image 4 defined by the field of view of the sensor. The pixels 5a available in principle are not completely used. In comparison with the use of all pixels 5a this is a recording with a coarser grid which corresponds to an image sensor having a reduced filling factor. The selection of the pixels 5a which is shown is only one example. According to the invention, a wide range of further schemes may be used. In particular, selection methods without row-by-row offset (column and/or row subsampling) or selection methods with non-periodic sequences or aggregates of pixels 5a can also be used.

Figure 5:
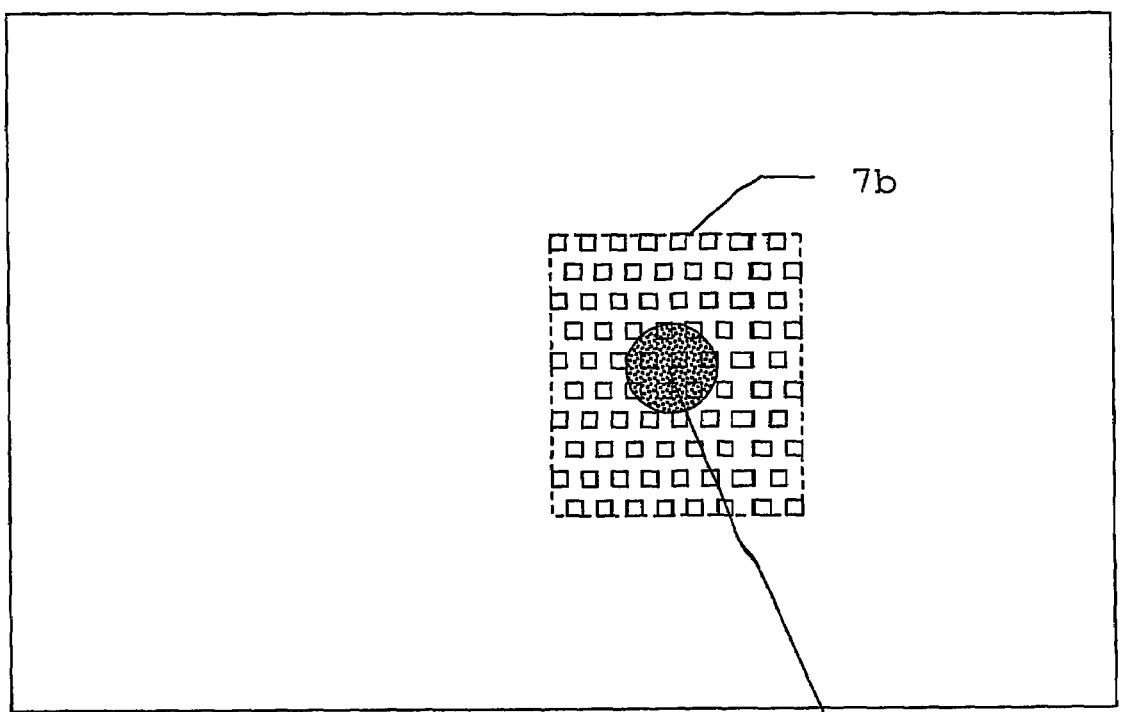
FIG. 5 shows the diagram of a selection according to the invention of image information by a combination of subwindowing and subsampling.

FIG. 5 shows a selection, according to the invention, of image information by a combination of subwindowing and subsampling. In the case of this selection, the approaches shown in FIG. 3 and FIG. 4 are combined so that only a partial region 7b of the image 4 is used for the determination of the position of the pattern 6. In this partial region 7b, not all pixels available in principle for an evaluation are actually used, but a selection of the pixels is made according to a scheme. This selection of image information thus follows a two-stage approach. Firstly, only a partial region 7b of the image is used at all. Secondly, not all available pixels are evaluated within this partial region 7b. According to the invention, other combinations of subwindowing and subsampling can also be used over and above this example. In particular, it is also possible to use a plurality of partial regions with different internal selection, it also being possible for these partial regions to overlap.

Figure 6:
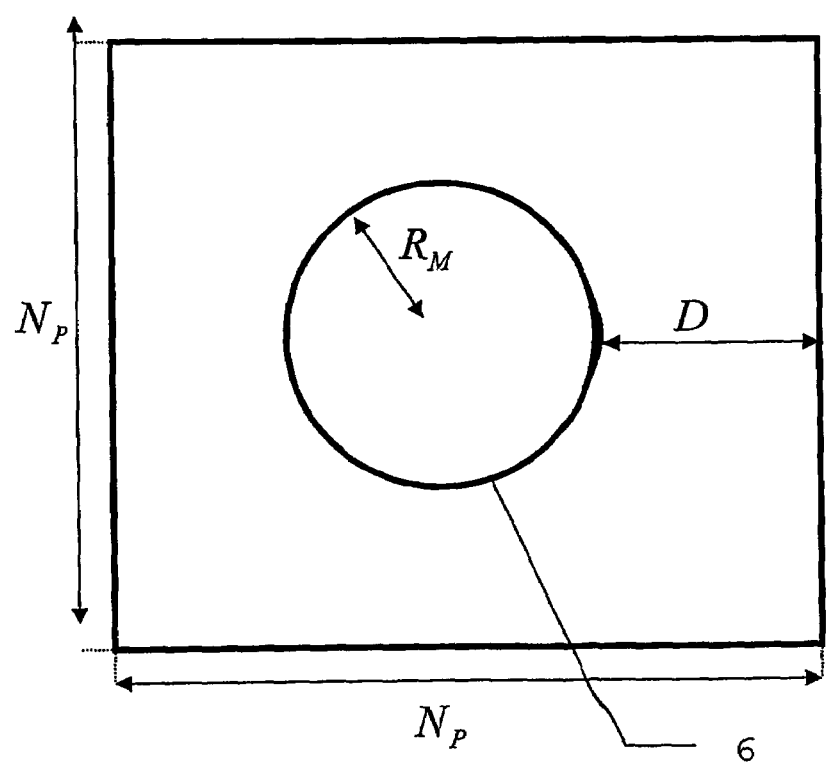
FIG. 6 shows the diagram of the conditions in the case of a dynamic measuring task and FIG. 7 shows the diagram of a transformation model for deriving direction information from the position of a pattern.

FIG. 6 illustrates, by way of example, the calculation of the optimum image resolution of a sensor having square pixels—as shown in FIG. 2 to FIG. 5—and the same velocity requirement in both sensor directions. The procedure can easily be generalised to include rectangular pixels and/or different velocity requirements.

Let the image resolution be $N_P \times N_P$ pixels. The time requirement $T_M$ of the direction measurement is found from the image resolution to be typically the $2^{nd}$ degree polynomial having the coefficient $C_n$.

$$T_M = C_2 N_P^2 + C_1 N_P + C_0 \qquad (2)$$

The pattern 6 is present on a sensor region with $N_P \times N_P$ pixels. In this example, the limits thereof are assumed to be a circle having a radius $R_M$. If it is wished to ensure a continuous direction measurement during the measuring task, the pattern 6 is not permitted to leave the sensitive region during the measuring time $T_M$. Thus, the maximum velocity of the pattern 6 on the sensor is:

$$V_{Max} = \frac{D}{T_M} = \frac{\frac{N_P}{2} - R_M}{C_2 N_P^2 + C_1 N_P + C_0} \quad (3)$$

The optimum subwindowing maximises this velocity:

$$N_{P,Opt} = \frac{2R_M C_2 + \sqrt{4R_M^2 C_2^2 + C_2 C_0 + 2R_M C_2 C_1}}{C_2} \quad (4)$$

If the image resolution $N_{P,Opt} \times N_{P,Opt}$ is chosen, this gives the greatest possible velocity of the pattern on the sensor which still permits successive measurements. If the pattern 6 has moved the distance D on the sensor during the measuring time, the measurement can still be carried out at the initially central bearing of the pattern 6 before the field of view of the detector has to be adjusted for the next measurement. If the value of $N_{P,Opt}$ exceeds the number of pixels in a sensor direction, e.g. $N_{P,Opt}$>number of pixels in the row, taking into account possible subsampling, the sensor must be adjusted in this direction without subwindowing. In this example, this means that, of rows which provide the possible row subsampling, all pixels which provide the possible column subsampling are evaluated. This would also be the procedure for the case of $C_2=0$.

If only a continuous adjustment of the field of use is to be effected, it is often also possible to determine the position of the pattern 6 comparatively coarsely, for example with a permissible error of measurement corresponding to half the field of view of the detector, if only the centre of the pattern is in the field of view of the sensor. This means that only a part of the area of the pattern 6 is in the evaluated sensor region. In this problem, the maximum permissible velocity of the pattern 6 on the sensor is $$V_{Max} = \frac{\frac{N_P}{2}}{T_M} \quad (5)$$

and hence the optimum resolution $N_{P,Opt} \times N_{P,Opt}$ of the evaluated image region is:

$$N_{P,Opt} = \sqrt{\frac{C_0}{C_2}} \quad (6)$$

Once again, if $N_{P,Opt}$ is greater than the number of pixels which can be evaluated—taking into account the subsampling—in a sensor direction, all these pixels are evaluated. The same applies to both sensor directions if $C_2=0$.

In the following figures, a possibility for calculating the desired direction information from the position of the pattern on the image sensor is outlined by way of example.

Figure 7:
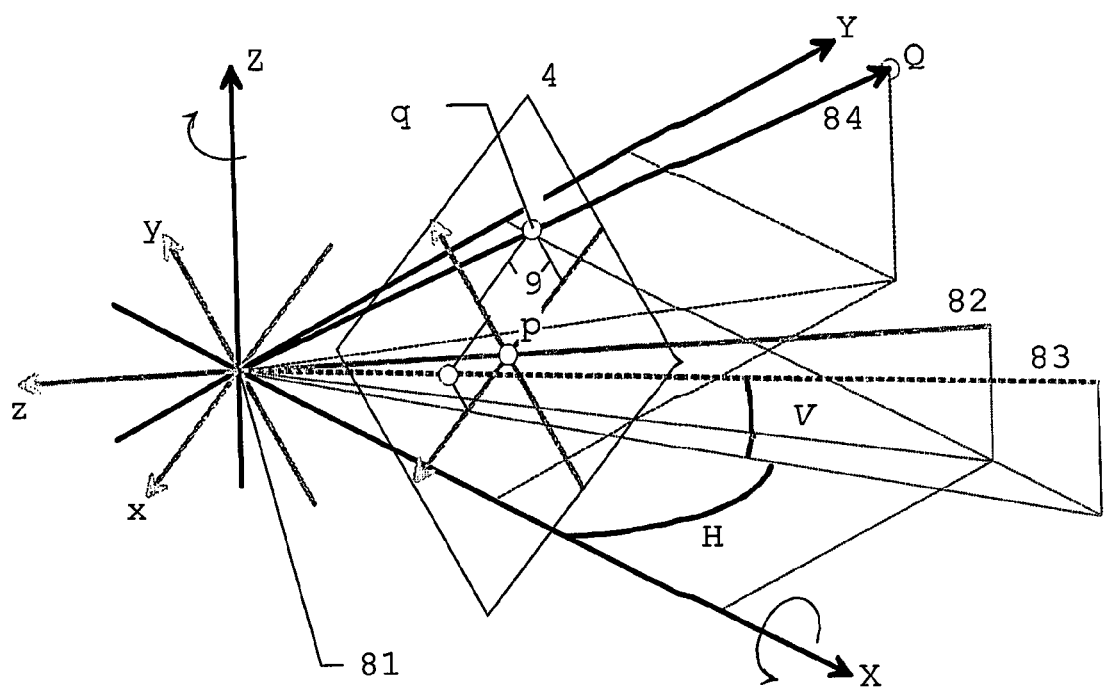

FIG. 7 shows the transformation model for the transformation of an image coordinate of a point q of the pattern as a polar angle of a detected object having an object point Q. By means of this transformation model, it is possible in principle to derive the position or the direction of an object point from the position of the pattern.

In order that the polar angle of an arbitrary object point Q within the field of view of the sensor can be determined on the basis of its position in the pattern or in the image 4 which is detected by the image sensor, and hence on the basis of its image coordinate, a mathematical description of the imaging of the object present in the field of view of the sensor as a pattern—or of an object point Q as a corresponding point q in the pattern—in the image form must be known. Below, the transformation of points in the image coordinate system x, y, z into the object coordinate system X, Y, Z is to be described with reference to FIG. 7. The Z axis points in the direction of the zenith and represents, for example, the vertical axis of a geodetic measuring instrument, and the X axis is formed, for example, by the tilting axis.

For a simplified transformation with limited accuracy, it is possible to make the following assumptions, a geodetic instrument which corresponds with regard to its systems of axes and its basic design to a theodolite being used by way of example as a starting point:

The projection centre 81 of the focusing of the objects detected within the field of view of the sensor onto the image sensor is at the point of intersection of vertical axis and tilting axis.

The tilting axis is perpendicular to the vertical axis.

The optical axis 82 and the theodolite axis 83 intersect at the projection centre 81.

Here, the optical axis 82 is defined as the axis through an optical unit and hence substantially that axis which passes through the centres of the lenses. The theodolite axis 83 is defined as that axis relative to which the angles of rotation about the vertical axis and the tilting axis are measured. This means that the point of intersection of the theodolite axis 83 with the image sensor in the case of a two-bearing measurement points exactly to that object point Q of the object which is to be surveyed. This corresponds to the sighting axis with respect to the crosshairs in the case of optical theodolites.

However, it is also possible not to start from these assumptions but to extend the transformation appropriately, for example axis errors—in particular an axis offset or an axis skew—being included in the transformation. This ensures a further increase in the accuracy of the transformation and is therefore particularly suitable in the case of geodetic measuring instruments of the highest precision class.

The calculations are limited to the focusing of an object point Q in a superior coordinate system, which is horizontal and the origin of which is at the projection centre 81, into the image plane of the image 4. The transformation into an arbitrary coordinate system can be carried out by means of displacement and rotation via the known Helmert transformation with a scale equal to one.

The transformation model for the transformation of a recorded image coordinate into an object coordinate is as follows:

$$r_q = r_P + T_0 \cdot \left( \frac{1}{m} \cdot T_{Hz,v} \cdot R_{Inc} \cdot r_Q \right)$$

where $r_Q$ is the object vector 84 of the point Q in the system (X,Y,Z).

$r_q$ is the vector of a point q of the pattern, i.e. of the copy of the object point Q on the image 4, measured in the image coordinate system x,y,z. The x and y components are determined by the recorded image coordinate 9. The z component corresponds to the chamber constant c which is defined as the distance of the image sensor and hence of the image 4 from the projection centre 81. The chamber constant changes with the position of a focusing lens of the optical unit and hence with the focused object distance.

$r_p$ is the image origin vector which describes the point of intersection p of the optical axis 82 with the image plane 4.

m is the imaging scale.

$R_{Inc}$ is the rotation matrix which relates the tilted theodolite plane and the horizontal plane.

$T_{Hz,v}$ is the transformation matrix which describes the orientation of the theodolite axis 83 based on the horizontal angle H, the vertical angle V and the corrections of the axis errors.

$T_0$ is the matrix for modelling the optical distortions.

FIG. 7 shows the above transformation of the object point $r_Q$ from the superior coordinate system X, Y, Z into the image coordinate system x, y, z. By means of the measured angle of inclination, the horizontal angle H, the vertical angle V and the axis corrections, it is possible to map the object point vector $r_Q$ into the system of the image sensor. The deviation of the optical axis 82 from the theodolite axis 83 and the optical distortions are corrected by means of suitable transformations and calibrations.

Approaches from photogrammetry, such as, for example, the modelling known from the prior art and attributable to Brown or Bayer, are suitable here. In the case of narrow-angle systems, the correction can be modelled by a simple affine transformation.

A further example of a conversion of the position of the pattern on the image sensor into direction information is the infinite focus arrangement. Here, the image sensor is mounted in the focal plane of an objective. If a beam of sufficiently small divergence emanates from the object point, the position of the—often circular—pattern resulting therefrom corresponds directly to the direction relative to the first principal point of the objective.

In the figures, the steps of the method, buildings and instruments used are shown purely schematically. In particular, no size relationships or details of the image recording or image processing can be derived from the diagrams. The points shown only by way of example as pixels also represent more complex structures or a larger number of pixels in an image sensor.

We claim:

1. A method for determining the direction to an object to be surveyed, using a geodetic measuring instrument comprising an image sensor, the field of view of which sensor detects at least part of the object to be surveyed, the method comprising the following acts:

recording an image with image information using the image sensor, the image depicting an object and the object representing a pattern in the image which can be coordinated with the object, wherein the position of the pattern within the image permits a determination of the direction to the object;

determining the position of the pattern within the image; and deriving direction information coordinated with the object from the position of the pattern, the direction from a detection point coordinated with the image sensor to the object being determined, wherein only a portion of the image information is selected and used for the direction determination, and wherein the portion of the image information is selected with regard to a specified accuracy of measurement.

2. A method according to claim 1, further comprising periodically omitting pixels, the periodicity being chosen so that the local resolvability of the position of the pattern permits the determination of the direction to the object with the specified accuracy of measurement.

3. A method according to claim 1, wherein the act of recording the image further comprises subwindowing as a selection of a partial region of the image sensor and subsampling as a specific omission of pixels within the partial region.

4. A method according to claim 1, wherein the act of deriving the direction information further includes verifying that the object is positioned at least partly within the field of view of the sensor.

5. A method according to claim 3, wherein the act of subsampling is performed before the act of subwindowing.

6. A method according to claim 3, wherein the selection of the partial region is made during the subwindowing on the basis of at least one of the following variables:
    object size;
    object distance;
    desired accuracy of measurement;
    dimensions of the pattern; and
    expected or measured maximum angular acceleration.

7. A method according to claim 3, further comprising omitting a selection of pixels during the subsampling on the basis of at least one of the following variables:
    object size;
    object distance;
    desired accuracy of measurement;
    dimensions of the pattern; and
    expected or measured maximum angular acceleration.

8. A method according to claim 1, further comprising omitting columns and/or rows of the image sensor during the subsampling.

9. A method according to claim 8, wherein the omitted columns and/or rows are in the form of a rectangular partial region of the image sensor.

10. A method according to claim 3, wherein the act of subsampling includes omitting pixels in a regular or stochastic sequence.

11. A computer program product having a program code, which is stored on a machine-readable medium, configured to carry out the method according to claim 1.

* * * * *